US007538666B2

(12) United States Patent
Campman

(10) Patent No.: US 7,538,666 B2
(45) Date of Patent: May 26, 2009

(54) AUTOMATED ACCOUNTABILITY LOCATING SYSTEM

(75) Inventor: Robert A. Campman, Greenville, PA (US)

(73) Assignee: Grace Industries, Inc., Fredonia, PA (US)

( * ) Notice: Subject to any disclaimer, the term of this patent is extended or adjusted under 35 U.S.C. 154(b) by 360 days.

(21) Appl. No.: 11/515,836

(22) Filed: Sep. 6, 2006

(65) Prior Publication Data

US 2008/0061962 A1 Mar. 13, 2008

(51) Int. Cl.

| | |
|---|---|
| ***G08B 1/08*** | (2006.01) |
| ***G08B 5/22*** | (2006.01) |
| ***H04M 11/04*** | (2006.01) |
| ***G01S 5/00*** | (2006.01) |

(52) U.S. Cl. ............................ 340/539.13; 340/825.36; 455/404.2; 342/357.07

(58) Field of Classification Search . 340/539.1–539.17, 340/825.36, 572.1–572.9; 342/357.06–357.1; 455/521, 404.1, 404.2
See application file for complete search history.

(56) References Cited

U.S. PATENT DOCUMENTS

| | | | | |
|---|---|---|---|---|
| 5,714,932 | A * | 2/1998 | Castellon et al. | 340/539.11 |
| 5,742,233 | A * | 4/1998 | Hoffman et al. | 340/573.1 |
| 6,198,394 | B1 * | 3/2001 | Jacobsen et al. | 340/573.1 |
| 6,714,133 | B2 * | 3/2004 | Hum et al. | 340/573.4 |
| 7,245,254 | B1 * | 7/2007 | Vogt | 342/357.06 |
| RE39,909 | E * | 11/2007 | Taylor, Jr. | 340/573.4 |
| 7,298,276 | B2 * | 11/2007 | Perez Garcia | 340/573.1 |
| 7,417,537 | B2 * | 8/2008 | Lee | 340/539.1 |
| 7,423,538 | B2 * | 9/2008 | Gonzalez | 340/573.1 |
| 2002/0109601 | A1 * | 8/2002 | Arens | 340/573.1 |
| 2006/0250234 | A1 * | 11/2006 | Maschke | 340/539.13 |

* cited by examiner

*Primary Examiner*—Jennifer Mehmood
(74) *Attorney, Agent, or Firm*—Daniel Kevin Dorsey

(57) ABSTRACT

An automated accountability system is achieved by a unique combination of at least one stationary, passive-infrared activated low-power wireless RF locator-transponder device, at least one personal issued "pager-like" RF transceiver device and a stationary transceiver contained in a stand-alone master command base monitor or a stationary transceiver connected to a personal computer with monitoring software. These three primary components form an automated accountability system for tracking and locating personnel. The locator-transponder device is capable of detecting the presence of a person or object. The person carries the adjustable level low power radio frequency transceiver device and as the transceiver passes the locator-transponder, a signal with at least identification, status and location information of person. The information is provided automatically without intervention to the automatic accountability system.

19 Claims, 6 Drawing Sheets

214 Passive Infrared Detector Electronics
224 MICRO Processor
230 Low Power Transmitter Electronics
BATTERY 334
BATTERY 335
OUTER CASE SHELL
342
344
346
250
332 Frame
Frame 332
240
214
224
230
Passive Infrared Detector Electronics
MICRO Processor
Low Power Transmitter Electronics
350
P.I.R Detector Optical 218

AUTOMATED ACCOUNTABILITY LOCATING SYSTEM

BACKGROUND OF THE INVENTION

Field of the Invention

The present invention relates to a tracking, locating and personnel accountability system. More specifically, the present invention relates to an automated accountability system that can be achieved by a unique combination of stationary, passive-infrared activated low-power wireless RF transmitter devices, personal issued "pager-like" RF transceiver devices and a stationary transceiver contained in a stand-alone command base monitor with the stationary transceiver connected to a personal computer with monitoring software.

CROSS-REFERENCE TO RELATED PATENTS

U.S. Pat. No. 5,317,305 patented May 31, 1994, entitled PERSONAL ALARM DEVICE WITH VIGRATING ACCELEROMETER MOTION DETECTOR AND PLANAR PIEZOELECTRIC HI-LEVEL SOUND GENERATOR, discloses alarm and lights which include a vibrating accelerator for motion detectors and a planar, low profile sealed, piezo hi-level sound generating transducer structurally and functionally coordinated with a resonating chamber casing structure to provide a hi-level audio alarm.

U.S. Pat. No. 6,016,099 patented Jan. 18, 2000, entitled AUTOMATICALLY ACTIVE PERSONAL ALERT SAFETY SYSTEM, discloses a small, lightweight personal alert safety system (Acronym is PASS) which has a self-contained battery powered electrical and electronic circuit, among other components, in a small casing for use by personnel working in dangerous environments, e.g., fire fighters and rescue workers and the like.

U.S. Pat. No. 6,756,901 patented Jun. 29, 2004, entitled MULTI FUNCTION ELECTRONIC PERSONAL MONITOR AND RADIO TELEMETRY CELL SYSTEM, discloses a small, multi-function electronic personal monitor and radio telemetry system under the control of a microprocessor. There is a personal communicator and monitor with communications consisting of duplex spread spectrum radio telemetry, under water sonar, acoustic ranging and signaling, infrared communications and visible light communications. A transceiver is part of the system and the transceiver is for transmitting and receiving at several different radiated power levels, defined as P.sub.1, P.sub.2, P.sub.3, P.sub.4, P.sub.5, through P.sub.n that vary in signal strength from 1 microwatt through 1 watt. Each power level P.sub.1, P.sub.2, P.sub.3, P.sub.4, P.sub.5, through P.sub.n being transmitted and received with encoded data and a personal ID uniquely assigned to the transceiver of the cell system. Also, the transceivers transmit and receive data being contained within a time frame and having digital instructions and coded format sectors. The power level ID varying in field strength defines a distance at which the transceiver detects the transmitted and received signal from another of the transceivers and the signal is indicative of the distance the transceiver is from the other transceivers. The system 110 of the present invention utilizes the transceiver of U.S. Pat. No. 6,756,901 with some modifications for use in the present invention as hereinafter described and with specific reference to FIG. 4.

These inventions are hereinafter incorporated by reference therein.

The Prior Art

U.S. Patent Application Publication No. 2004/0183682 to Tenarvitz describes methods and systems for locating subjects and providing event notification within a tracking environment and badge for use therein. The systems utilize radio frequency (RF) and infrared (IR) parts to locate subjects (objects and persons) within the environment. There is a microprocessor in each badge worn by the subject that is battery operated and transmits three signals. The first is a shorter interval, digitized, IR light signal to identify the location of the subject. The second is a shorter low powered RF signal to provide local area zones of the subject. The third is a longer interval, digitized, high power RF signal to provide wide area zones of the subject's location.

U.S. Patent Application Publication No. 2004/0070501 to Degrauwe et al. describes and shows a system for detecting individuals or objects passing through an entrance-exit of a defined space see FIG. 1. Each individual or object has a portable electronic unit (40) that is described in paragraph number 23 and 33.

U.S Patent Application Publication No. 2005/0035862 to Wildman et al. describes an article locating and tracking apparatus and method. In a first embodiment, a person wears a badge 12. The activity that is monitored is directed to caregivers.

U.S. Pat. No. 5,917,414 to Oppelt et al. is directed to certain persons which exhibit slightly diminished mental capacity, such as some categories of senior citizens. These persons require substantially constant monitoring of their physical condition, and may need to be reminded of certain activities which must be undertaken either on a periodic basis or on an "as needed" basis. The body-worn monitoring system has a number of motion sensors, which are carried on the body of a person whose condition is to be monitored. The motion sensors generae signals which are supplied to an evaluation unit, which is also worn by the monitored person. The evaluation unit evaluates the data from the motion sensors in order to identify the current condition of the monitored person. The result of the evaluation can be communicated to the monitored person optically and/or acoustically.

U.S. Pat. No. 6,331,816 to Myllymaki is an automatic control system for security apparatus based on the presence of a user. The user wears a watch type transmitter that is detected upon the opening or closing of the door. The system basically detects that the user has left and then activates a burglar monitor.

U.S. Pat. No. 6,137,407 to Akagawa et al. is a humanoid detector and method that senses infrared (IR) radiation and subject size. There is no transmitter on the humanoid.

U.S. Pat. No. 6,522,078 to Okamoto et al. is a remotely controlled power supply system for detecting infrared (IR) thermal energy that enters a location and the system controls the power supplied to electrical equipment.

U.S. Pat. No. 6,798,342 to Addy is a security system with remote indication devices. There is a description of a remote device worn by the user, see column 5, lines 30-45.

U.S. Pat. No. 5,309,146 to Kenet describes a room occupancy indication means and method that is utilized in a building to control HVAC.

U.S. Pat. No. 6,856,249 to Strubbe et al. is a system and method for keeping track of normal behavior of the inhabitants of a house. Observation units, such as video cameras, are positioned throughout the house and keep predetermined areas under surveillance over time.

U.S. Pat. No. 6,762,686 to Tabe describes interactive wireless home security detectors that monitor fire, smoke and home security to protect the home.

U.S. Pat. No. 5,293,097 to Elwell is directed to a fully automatic energy efficient lighting control and method of making same. Settings are preset by the user and automatically operate when the user enters the room.

None of the prior art discusses a system and method for locating, tracking and accounting for personnel in an enclosed area, such as a building. Thus, a need exists for a simple and reliable system that has the ability to locate and track personnel inside a building, outdoors or in a campus environment and is a valuable tool that can provide several benefits to both the security of the building housing a corporation or an institution and the safety of the personnel contained within.

SUMMARY OF THE INVENTION

Accountability is a term commonly used by safety and security personnel. Accountability includes providing specific information about personnel including presence, location and safety status. Accountability systems are widely used by fire departments, police, emergency first responders and security personnel. For example, emergency first responders may include fire fighters, police, ambulance personnel, paramedics or emergency medical technicians and hazardous materials (Haz-Mat) teams on the scene of an emergency. Currently, there are no automated means to accomplish a true and accurate accountability of all personnel for all professions, either independently or collectively. It is often a problem during a response to an emergency such as a fire or accident, to know what groups are present and which individuals are present from these groups.

The system operates by deploying passive-infrared activated, low-power RF transmitters, referred to as locator transponders, at various locations throughout a building where personnel will pass by or through, such as a doorway or hallway. These locator transponders contain an ability to detect the presence of a person by various sensing means such as, in this instance, passive-infrared radiation from the person's body heat. Other detection methods can also be used such as ultrasonic, RF-field, magnetic field, capacitive-sense, visible light disturbance, pressure floor mat or other sensors that indicate a person's presence.

The system inherently provides the ability to track individuals throughout a building or multiple building environments. This is accomplished by the command base monitor, which is recording, storing and displaying the path taken by individuals wearing the personal transceiver device as they travel throughout the environment in which the local-transponder devices are present. As stated, the person wearing the personal transceiver device will receive the local-transponder's RF transmitted signal as they pass by it. The personal transceiver device then will automatically retransmit a received location code along with its own identification and status data back to the command base monitor for viewing and recording.

In one of the embodiments, the automated accountability system can be utilized with fire fighters during an emergency incident and can be considered 'automatic' as part of a standard operating procedure when using a telemetry personal alert safety system device. The Telemetry Personal Alert Safety System or TPASS is part of the system and also includes the command base monitor to receive and send information. The TPASS device is a rugged and more durable unit and includes the personal transceiver device. The TPASS device operates with the features of the personal transceiver device and includes other characteristics that are more useful, practical and have significant value and use for fire fighters. This system contains many of the attributes described for the personal transceiver device based automated accountability system plus additional features unique only to a TPASS device. Thus, the system will identify by name and ID number, who is present, where they are located and what their safety status is. Furthermore, the system identifies which groups of emergency first responders are present, such as fire fighters and police.

Two additional features of the TPASS system include automatic Personal Accountability Report; know by fire fighters as a PAR check, and a roll-call feature. The PAR check is typically initiated by a commanding officer, at incidents involving fire fighters. The PAR check requires that all active fire fighters' safety status be known and provides the information that they are accounted for. Traditional accountability methods in use today include using a tag system in which fire fighters must remember to bring their tag to a tally board, physically searching and finding the fire fighters at the scene, or attempting communications by use of a two-way voice radio. The voice radio communication method requires the fire fighter to manually respond by initiating a voice reply to indicate their presence and status. This is often considered to be a nuisance to fire fighters as they must stop what they are doing to manually press the voice radio's push-to-talk button to respond to the PAR request.

The TPASS system can be configured to automatically perform the PAR check on a periodic basis, or anytime on demand. The command base unit initiates the PAR request by transmitting a specially encoded RF signal to the TPASS units. Once, the PAR request is received by the TPASS unit, the TPASS unit will immediately respond by automatically transmitting back a PAR request acknowledgement to the command base which provides the incident commander knowledge that the fire fighter's TPASS has received the PAR request. The TPASS will then gather its status data and transmit the PAR information in an RF signal containing the fire fighter's identity and status data. This information is received and displayed back on the command base monitor. The PAR status data may include, but is not limited to the following: motion or movement of the individual, temperature of the environment in which the fire fighter and TPASS unit is in, location of where this individual is, air pressure of a breathing apparatus air tank, the elapsed time of operation, the amount of air remaining, motion alarm activated, panic alarm activated and recall or evacuate signal activated or acknowledged. In addition to the status information received from a PAR check, this also inherently verifies the radio signaling communications link between the fire fighter and the command base monitor.

Accordingly, it is an object of the invention to provide an apparatus including a locator-transmitter device having a sensor input including but not limited to a passive infrared detector, mechanical or electronic switch input, ultrasonic sonar sensor, optical sensor, radio-frequency (RF) field sensor or other sensor for detecting the presence of a person or object and which contains an adjustable and selectable means for controlling the radiated RF transmitter power output to limit the propagation of its detectable radiated RF signal from a range of several inches to several hundred feet, and a settable unique identity code contained within its emitted RF signal to identify the device and its emitted RF power output level.

Another object of the invention is to provide a locator transponder device containing a multiple-element pyroelectric sensor for determining the direction of travel in which a detectable object or person passes by the locator transponder device.

A further object of the invention is to provide a locating system comprised of one or more local-transponders containing a locator-transmitter device and a passive-infrared detector and low-power RF transmitter device that transmits a location-encoded low power RF signal of a controlled and limited propagation distance, and a personal transceiver device capable of receiving the local-transponder signal and retransmitting this signal incorporated into its own unique identification and status data to a receive-capable decoding device that indicates and displays location, status and identity of the received signal and person wearing the personal transceiver device.

A still further object of the invention is to provide a tracking system implemented from the locating system wherein the receive-capable decoding device displays and records the path individuals travel throughout an environment containing the local-transponders.

An object of the invention is to provide a tracking system implemented from the locating system wherein the receive-capable decoding device displays and records the path individuals travel throughout an environment including a time and date recording of each location visited.

Another object of the invention is to provide a tracking system implemented from the locating system wherein a personal transceiver device attached to a person or object will provide the location and status of other individuals or objects as requested through the requester's own personal transceiver device.

It is an object of the invention to provide the automated personnel accountability system wherein the system is comprised of identification and status encoded RF transmitter devices automatically communicating a periodic RF signal or other signal to a receive-capable decoding device to display and indicate at least one of the following: the presence of personnel, status of personnel, and location of personnel.

Another object of the invention to provide a automated personnel accountability system comprised of identification and status encoded RF transmitter device automatically communicating a response for the purpose of implementing an automatic 'personal accountability review (PAR) check.

A further object of the invention to provide the automated personnel accountability system containing identification and status encoded RF transmitter device carried or worn by personnel or attached to objects that are automatically communicating by RF transmitted signal a response for the purpose of implementing an automatic 'roll-call' check.

It is an object of the invention to provide a Personal Alert Safety System containing a radio transceiver transmitting a radio signal containing identification and status encoded data that automatically transmits the encoded RF data signal to a receive-capable device display unit upon request from the receive-capable display unit for the purpose of performing a Personal Accountability Review (PAR) and determining the presence and status of personnel automatically without intervention by the individual.

It is an object of the invention to provide a personal alert safety system containing a radio transceiver transmitting a radio signal containing identification and status encoded data that automatically transmits the encoded RF data signal to a receive-capable device display unit upon request from the receive-capable display unit for the purpose of performing a Personal Accountability Review (PAR) and determining the presence, status and location of personnel automatically without intervention by the individual.

A still further object of the invention to provide a locating system in which an individual wearing the personal transceiver device can determine the location of one or more other individuals wearing the personal transceiver device within an environment containing the local transponders by querying the other person's personal transceiver device to automatically transmit a signal containing their location code and status back to the transceiver device that initiated the query.

It is an object of the invention to provide a system for determining the distance between individuals wearing the personal transceiver devices by querying each individual's personal transceiver device to obtain the last location-transponder device code received by the individual's personal transceiver device and determining from the location encoded signal received the distance between individuals or objects.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. For example, other features of the system are, in addition to providing location data including the locator transponder transmitting other data of interest such as the number of personnel who have passed through a particular location during a certain time period, a history trail of all individuals who have passed into a location and other information such as time or temperature.

BRIEF DESCRIPTION OF THE DRAWINGS

Preferred structural embodiments and preferred subcomponents of this invention are disclosed in the accompanying drawings in which:

FIG. 3 illustrates a combination of FIGS. 3A, 3B, 3C and 3D in accordance with the present invention;

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
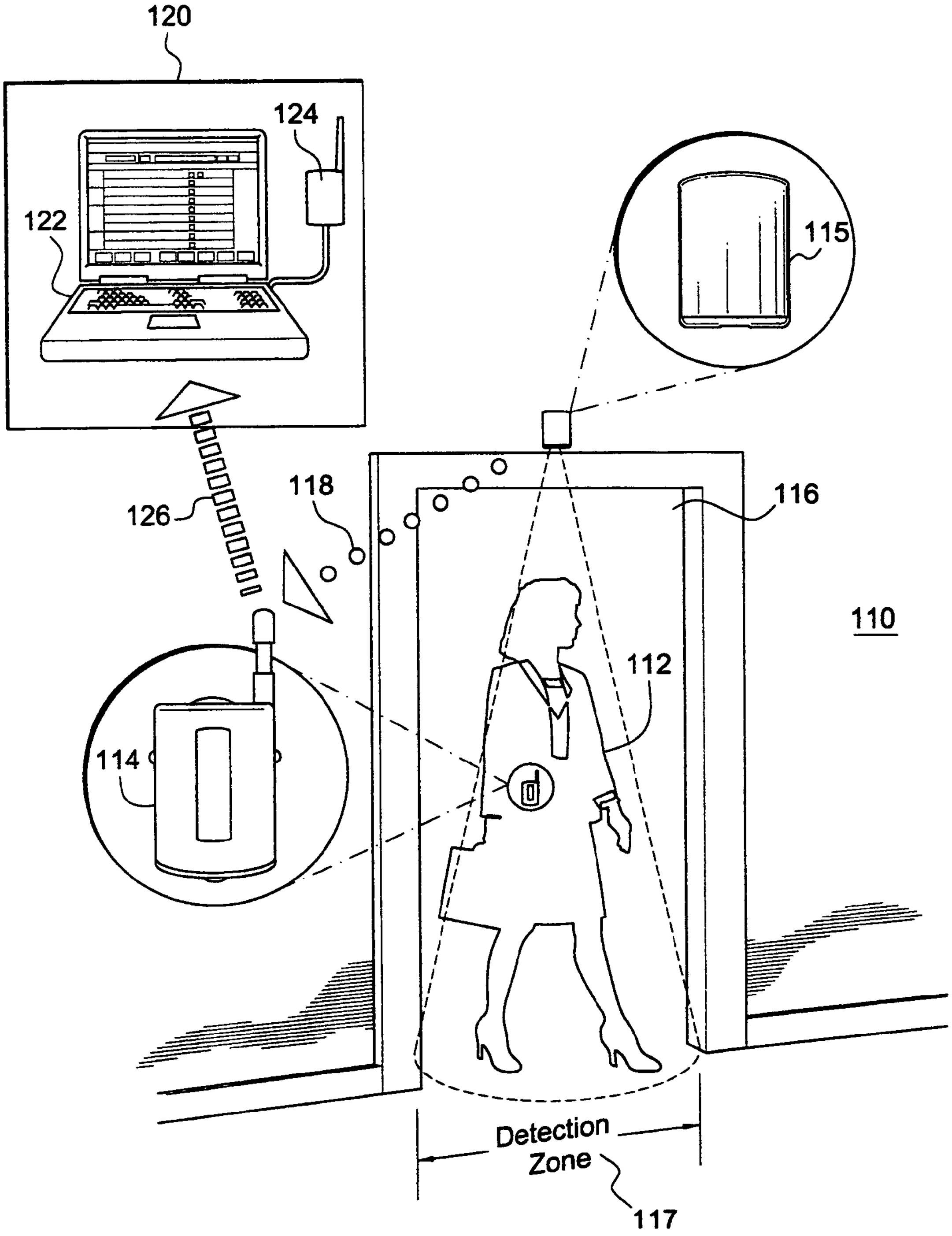
FIG. 1 illustrates basic components of an automatic accountability system in accordance with the present invention.

FIG. 1 shows the basic components of the automatic accountability system, generally indicated by reference numeral 110, as is contemplated in the first embodiment of the present invention. As is commonly known, a human body has a temperature of approximately 98.6 degrees Fahrenheit. Using this body temperature which is essentially heat being produced by the person a detection of this heat is utilized. Each person 112, as shown in the figure, carries a personal transceiver device 114.

A locator transponder 115 is mounted above a doorway 116 so that when the person or individual 112 goes through the doorway 116 the body heat of the person 112 is sensed or detected by the locator transponder 115. A more detailed description of the components of the locator transponder 115 will be given with reference to FIGS. 2 and 3. The locator transponder 115 has a controllable and limited detection zone or range 117 for determining the presence of the person 112 carrying the personal transceiver device 114. Upon sensing the person 112, carrying the personal transceiver device 114 and passing through the doorway 116, the locator transponder 115 emits a low power radio frequency (RF) signal 118. The locator transponder 115 contains an adjustable RF power output level that is used to precisely control the range or propagation distance of its emitted RF signal 118. The RF signal 118 is encoded, encrypted and transmitted in a protocol only recognizable to other devices containing the matching decoding intelligence. One such device is the small pager-sized personal transceiver device 114. The signal 118 contains a location code representing a particular place or location in which the locator transponder 115 is installed.

The personal transceiver device 114 receives this location code from the locator transponder 115 and retransmits this code along with its own unique identity and status code to a PC command base monitor, generally indicated by reference numeral 120. The PC command base monitor 120 consists of a personal computer 122 running a unique software program and is connected to a receive-capable decoding device or external tansceiver 124 that receives the radio frequency (RF) signals 126 from the personal transceiver device 114. The personal transceiver device 114 can be configured to automatically transmit a signal to the PC command base monitor 120 each time it receives a signal from the locator transponder 115 thereby showing in virtual real-time on the personal computer 122, the location and status of each individual person carrying a personal transceiver device 114.

The command base monitor or unit 120 can exist in many forms. The two most common forms of this invention are first, a stand-alone embedded computer with LCD display and integrated system radio transceiver, and secondly a personal computer (PC) running custom software program communicating with an external system radio transceiver, such as external transceiver 124. The PC software command base monitor 120 manages the radio signals transmitted to and received from the personal transceiver device 114 via the external transceiver unit 124 connected to the port of the PC. This external transceiver 124 receives and decodes the radio signals sending them to the PC for processing by the software program. The software program contains a database of personnel names and identification numbers along with the local-transponder location correlation codes. The external transceiver 124 passes along the decoded radio signals received from the personal transceiver device 114 for further PC processing. The PC then correlates the received data to determine the person's identity, status and location. Each signal received and processed by the PC software is put in a data-log and stored with a time and date stamp. The data-log can then be retrieved later and reviewed showing a history of where personnel have been located and at what time, plus provide the time and location of where an emergency situation or other event occurred. This system feature provides personnel tracking and locating at a given time and automatically records this information for future recall, thus providing accountability of personnel. The PC software can also be used to send and receive text messages to and from personal transceiver device 114, and monitor and record the text messages sent and received between personal transceiver device 114 and other similar transceiver devices.

The person 112 wearing the personal transceiver device 114 passes by the locator transponder 115. The transponder 115 detects their presence, in this instance by passive-infrared body heat or by one of the other methods described. As a result of detecting the person's presence, the locator transponder 115 begins transmitting a burst of low-power RF signals having a limited and controlled propagation range. These low-power RF signals contain data specifically representative of the local-transponder's location. The personal transceiver device 114 receives the low power RF signals and the personal transceiver device 114 can then retransmit this location data along with its personal identification and status data back to the command base monitor 120. The command base monitor 120 will then display the person by name, identification number and show their status and location plus display and record the time and date stamp as this occurs. An example would be recording the path a person takes while moving throughout a building identifying the locations they were at and when they were there.

Figure 2:
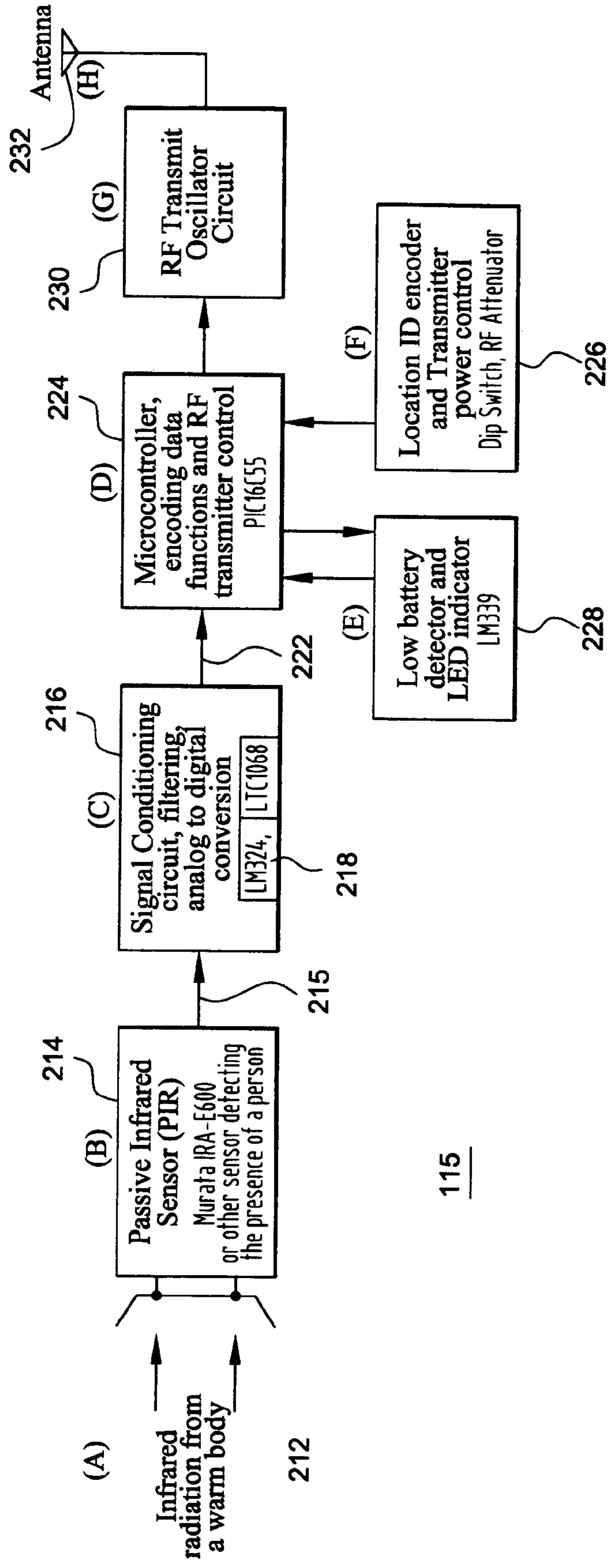
FIG. 2 illustrates a block diagram of a locator transponder utilized in the system in accordance with the present invention.

With reference to FIG. 2, the locator transponder 115 of the present invention is illustrated in a block diagram. The locator transponder 115 performs basic functions of detecting the presence of the person 112 carrying the personal transceiver device 114, and, based on this detection, transmitting a burst of encoded low power radio frequency signals. As previously discussed, the human body has a temperature of approximately 98.6 degrees Fahrenheit and emits infrared radiation 212. The locator transponder 115 comprises of a sensor 214 for sensing the passive infrared radiation 212 to determine the presence of the person 112. This infrared radiation 212 is detected, by the sensor 214, which is a passive infrared sensor (PIR), such as the Murata IRA-E600, which uses a pyroelectric sensing element, similar to those commonly used in alarm security and home automation products. The signal 215 provided by the PIR sensor 214 is sent to a signal conditioning circuit 216 for filtering and converting from an analog signal to a digital signal. The circuit 216 conditions the signal with low-pass filtering electronics, such as a LM324 operational amplifier 218 and then converts the signal to a useable digital form by using an analog to digital converter 220, in this instance, a Linear Technologies LTC1198 is used. The resulting digitized signal 222 can then be processed by microcontroller 224, such as the widely used Microchip PIC16C55. The microcontroller 224 will then read the unique location code set by a dipswitch 226 contained within the locator transponder 115. The RF power level setting assigned to this locator transponder 115 is also read and the battery condition

228 of the locator transponder 115 is determined. This information is then encoded into an encrypted data stream with error checking codes added for insuring message integrity and security.

The microcontroller 224 then turns on the low power radio frequency (RF) transmitter 230 and modulates the RF signal according to the encrypted data stream. The RF signal 118 is propagated out of the locator transponder 115 using an antenna 232. The microcontroller 224 sets the RF output power level to limit the receivable range or detection zone 117 of the RF signal 118 by the personal transceiver device 114 carried by the person 112 passing by the locator transponder 115.

Figures 3A, 3B, 3C, 3D:
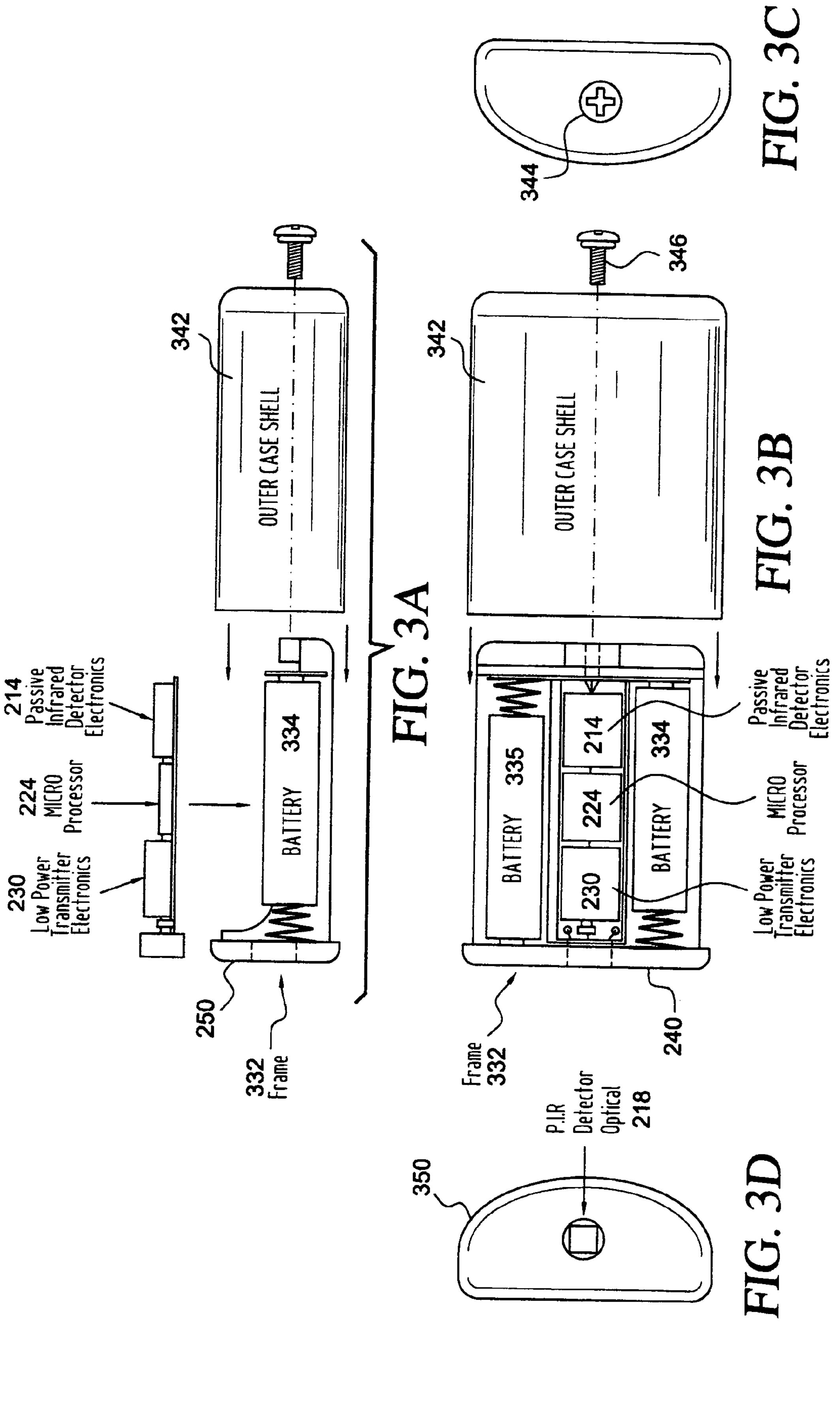
FIG. 3A illustrates a side view of the location transponder utilized in the system in accordance with the present invention.
FIG. 3B illustrates an exploded top view of the location transponder utilized in the system in accordance with the present invention.
FIG. 3C illustrates an end view of the outer casing of the location transponder utilized in the system in accordance with the present invention.
FIG. 3D illustrates a bottom view of the frame of the locator transponder utilized in the system in accordance with the present invention.

The mechanical construction of the locator transponder 115 is illustrated in FIG. 3 which is an exploded view and includes FIGS. 3A, 3B, 3C and 3D. Looking at FIG. 3A, which illustrates a side view of the locator transponder 115, there are two primary parts to the construction of the transponder 115. The first is a frame piece 332. The frame piece 332 holds power to transponder 115 with batteries 334, 335. The infrared sensor 214 is mounted in the frame piece 332. The processing electronics or microprocessor 224 and the low-power RF transmitter 230 are also mounted in the frame 332. With reference to FIG. 3B, which illustrates a top view, the second primary part is the shell 342. The shell 342 encloses the frame 332 to conceal the associated components from the outside. As shown in FIG. 3C, there is a hole 344 in the end of the shell 342, so that the frame 332 and the shell 342 can be held together with a screw 346 which pulls the frame 332 into the shell 342. FIG. 3D illustrates the bottom 350 of the frame 332 wherein the PIR senor 214 for detecting the passive infrared radiation 212 of the person 112.

Figure 4:
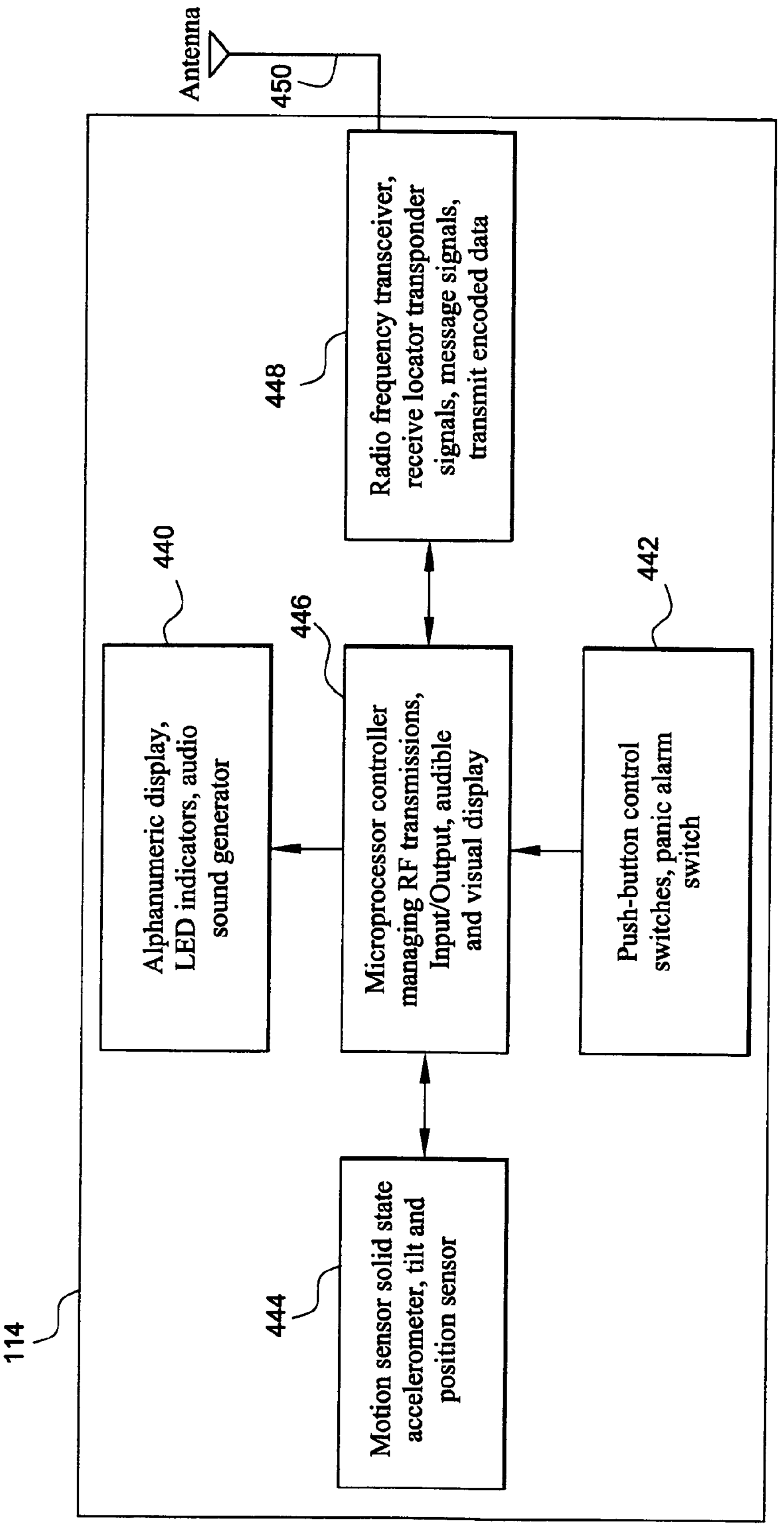
FIG. 4 illustrates a block diagram of a personal transceiver device utilized in the system in accordance with the present invention.

FIG. 4 illustrates a block diagram of the personal transceiver device 114 utilized in the system 110 in accordance with the present invention. In the present invention, to track and determine the location of an individual, the person 112 wears the personal transceiver device 114, which can be a small pager-sized RF transceiver device. The personal transceiver device 114 is a signaling device that provides the user a means for transmitting an emergency distress-call such as an alarm signal through and audio sound generator 440. There is also an alphanumeric display and LED indicators. The personal transceiver 114 can also monitor and receive signals from other personal transceiver devices as well as send and receive text messages. The emergency distress-call transmission is initiated by either pressing a panic button 442 on the device 114 or by automatic activation from a self contained lack-of-motion sensor 444. The motion sensor 444 includes solid-state accelerometer as well as a tilt and position sensor. The personal transceiver device 114 can also contain features of call-back, evacuate and those types of functions associated with a pager, such as paging. The device 114 further includes microprocessor controller 446 for managing RF transmissions, input/output, audible sounds and visual display. There is also a radio frequency transceiver 448 for receiving locator transponder signals, message signals and for transmitting encoded data. An antenna 450 is connected thereto.

Figure 5:
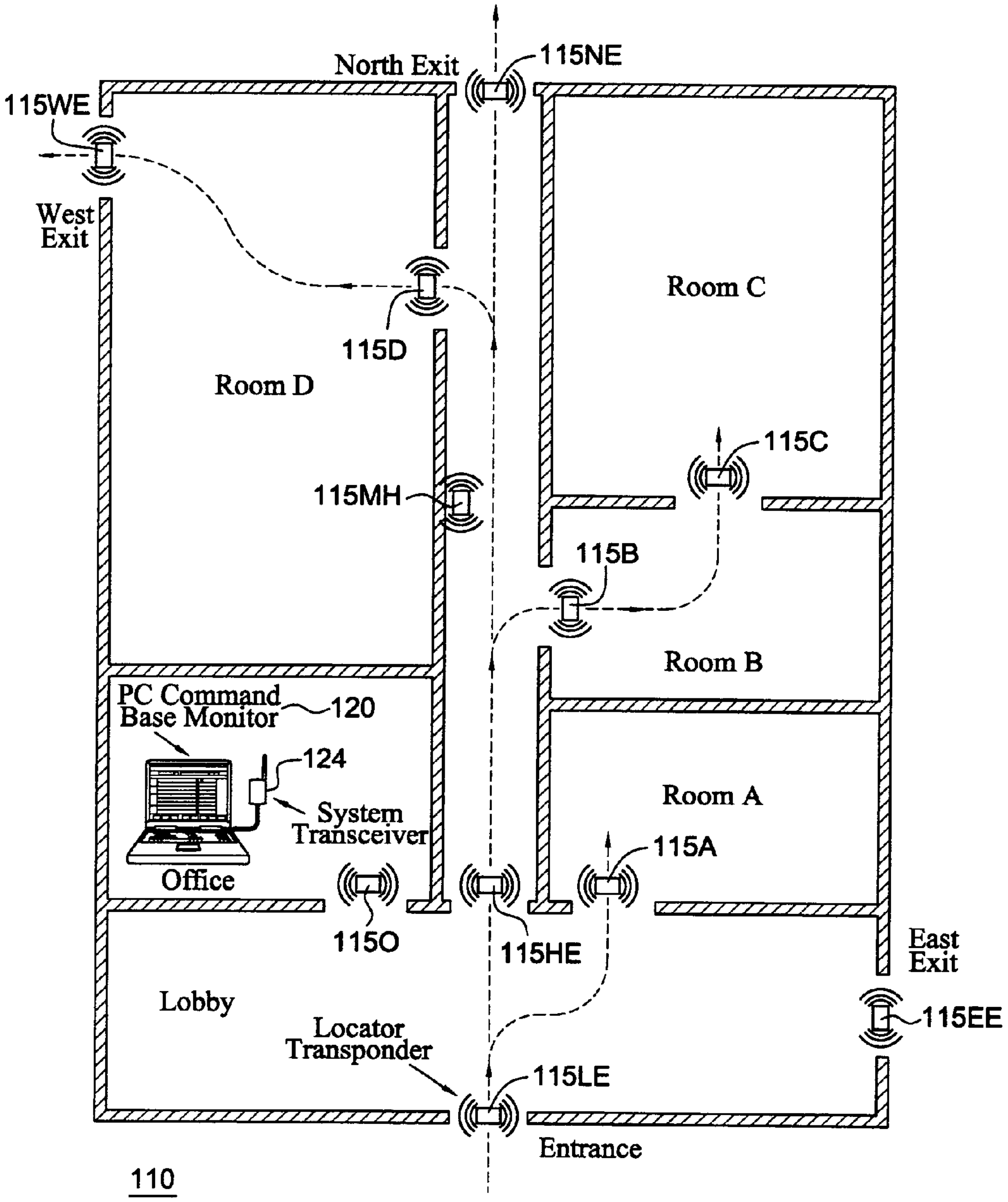
FIG. 5 illustrates one embodiment of the system deployed in a building in accordance with present invention.

As an example of the operation of the system 110 reference is now directed to FIG. 5 which illustrates the system general indicated by reference numeral 110 with all the components being deployed in a building having six rooms, one hallway and four entrance/exit areas. It should be realized the system 110 of the present invention can be applied to nearly any size building facility, campus environment or even a mine, because the system 110 is scalable to any size accountability environment.

Different physical locations for installing the locator transponder 115 will require different detection ranges, such as the detection zone 117 illustrated in FIG. 1. These detection ranges or zones are adjustable from a few feet to hundreds of feet to permit successful operation in a variety of environments ranging from a small closet to a large hallway or room. In addition to the functions described, there is a low battery detection circuit that uses an LED indicator to provide visual notification when the battery needs replacing.

In FIG. 5, each of the locator transponders is identical in construction and components. However, each locator transponder is giving a unique location code, which corresponds to or identifies where that particular transponder is placed. Locator transponder 115LE corresponds to the lobby entrance to the building. Locator transponder 115EE corresponds to the east exit. Locator transponder 115A identifies the entrance to Room A. Locator transponder 115HE corresponds to the entrance to the hallway. Locator transponder 115MH identifies the middle of the hallway. Locator transponder 115B corresponds to Room B. Locator transponder 115C identifies Room C. Locator transponder 115NE corresponds to the north exit of the building. Locator transponder 115D identifies Room D. Locator transponder 115WE corresponds to the west exit. The office, where the PC command base monitor 120 is set up, is identified by locator transponder 115O. The various dashed lines in FIG. 5 illustrate the paths that may be taken by the person 112 carrying the personal transceiver device 114 as that person moves throughout the building.

As the person 112 with a personal transceiver device 114 passes by each locator transponder 115 a new transmitted signal will be sent from the personal transceiver device 114 carried by the individual 112 to the command base monitor 120 showing the location of the person or individual 112. Also, the direction of movement by a person 112 can be determined, such as whether the person 112 is entering or exiting a location. The personal transceiver device 114 can be configured to automatically transmit the location data and other data as the person 112 passes by each local transponder. Thus, the locator system 110 provides instantaneous location and data. In a particular application, the personal transceiver device 114 can be programmed to transmit the location and status data only as needed in an emergency situation such as when a person presses the personal transceiver device 114 panic button or from a lack of movement by the person wearing the personal transceiver device 114. The location and status of a person wearing the personal transceiver device 114 can be requested intentionally or automatically from the command base monitor 120.

The system 110 can also be configured so that location and identification data are only retransmitted at a high RF power level during an emergency condition such as that which would be initiated by pressing the panic button of the personal transceiver device 114 or from the lack-of-motion sensing alarm. In addition, the system 110 can be configured so that an inquiry from the command base monitor 120 causes the personal transceiver device 114 to transmit its identification, status and location information back to the command base monitor 120. It is also a feature of the command base monitor system 120 where the personal transceiver device 114 can be configured to prompt other personal transceiver device 114 units or the command base monitor 120 for the location of other individuals 112 wearing the personal transceiver device 114. The virtual real-time status and location of personnel 112 wearing the personal transceiver device 114 can be determined and displayed at the command base monitor 120 using this method.

The locator transponder 115 contains the passive-infrared sensor 214 and an adjustable RF transmit power level feature that facilitates a variable signaling range or distance between the locator transponder 115 and personal transceiver device 114 at which they can communicate. This feature is necessary for setting the transmit distance depending on the physical attributes of the environment. For example, a large hallway or large door entrance point requires the locating transponder 115 to use a slightly higher RF power level in its transmitted signal so that the personal transceiver device 114 can receive the signal. Conversely, locator transponders used at two small doors adjacent to each other would require a lower transmitted RF power level to successfully communicate their location data to the personal transceiver device 114.

Furthermore, when there is a received polling signal, this indicates a person is on the scene and it can be determined that they are present and have entered the premises. With the system 110 installed in a building, it can be determined that a person has passed through an entrance area. As noted, the received signal at the command base monitor 120 is decoded and recoded with a time-date stamp in a data-log and stored. When the polling signal is no longer received from the personal transceiver device 114, and there is a received signal indicating the person has passed through an exit area, it can be determined the person has left the premises. This method facilitates an automated accountability by knowing who is present, where they are located and what is their safety status.

Figure 6:
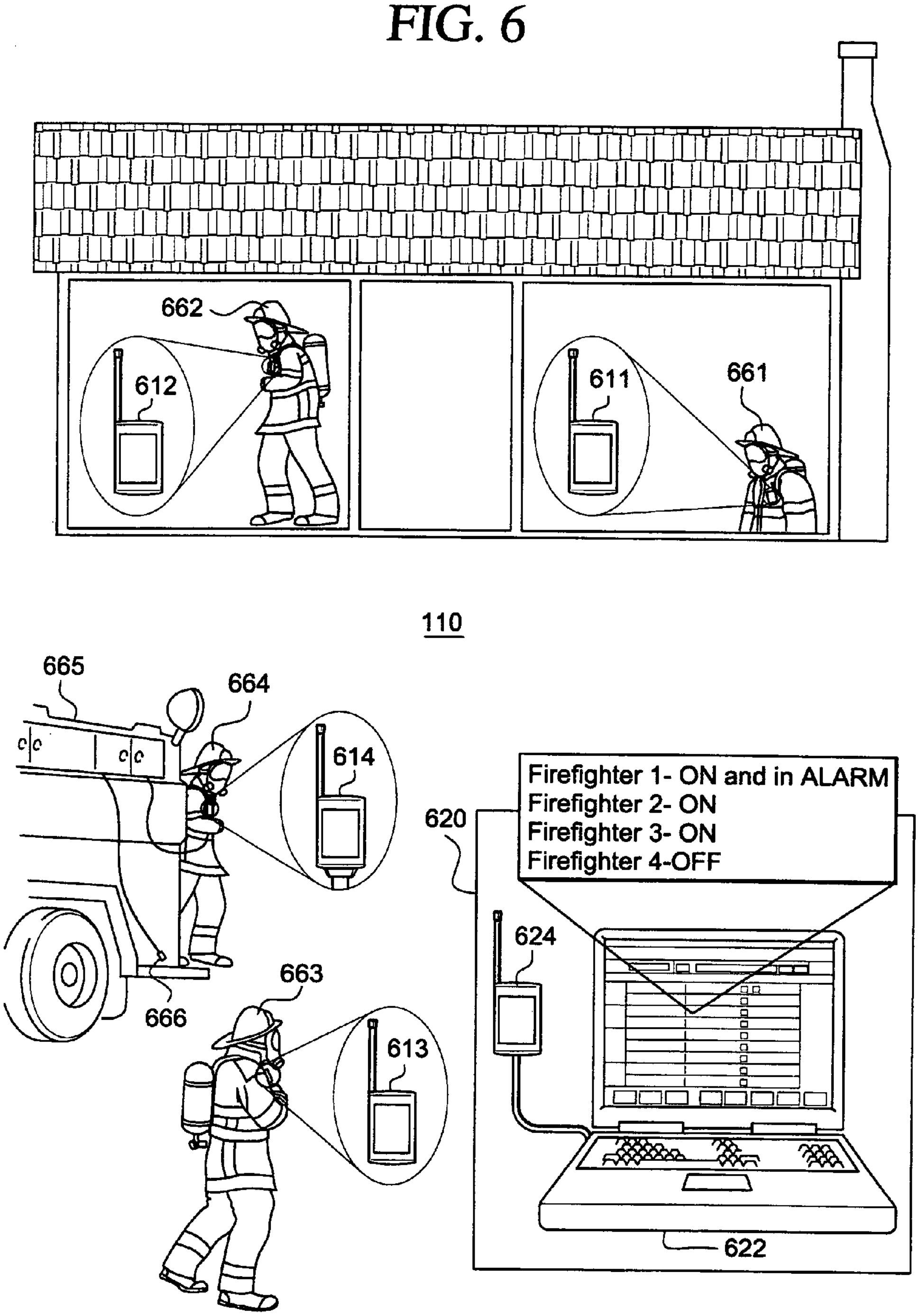
FIG. 6 illustrates another embodiment of the automatic accountability system for locating personnel such as in a fire, ground or other emergency environments in accordance with the present invention.

As shown in FIG. 6, the locating system 110 described can be used for automatic accountability particularly in a fire, ground or other emergency incident environments. In this figure, the personal transceiver device 114 is carried by a fire fighter and is typically clipped to their belt or other piece of clothing. The personal transceiver device 114 contains a radio transceiver capable of transmitting an RF signal that has a limited propagation distance ranging from several feet to 1 mile depending on the environment and application in which it is used. A transmitted RF signal is emitted from the personal transceiver device 114 at regular intervals regardless of the 'On' or 'Off' state of the device. This signal is referred to as a polling-signal, again occurring at periodic intervals regardless of the state of the device. As personnel wearing the personal transceiver device 114 come within proximity of the command base monitor 120, their transmitted polling signals are automatically received by the system radio receiver and then processed by the monitoring software.

With reference to FIG. 6, the automated accountability system 110 is now described for use by fire fighters. Each of the fire fighters are individually indicated by reference numbers 661, 662, 663 and 664. It is important to realize the system can be used to implement any personnel accountability system in which automated means are required or desired to maintain knowledge and status of personnel present at a particular location. In this embodiment, the automated accountability system 110 is achieved by combining the personal transceiver device 114 in a TPASS. The modified TPASS or personal transceivers TPASS 611, 612, 613 and 614 are attached to each of the fire fighters 661, 662, 663, and 664, respectively. The command base monitor 620 is facilitated by personal computer 622 running the personnel accountability software program and with the personal computer 622 connected to external system radio transceiver unit 124.

A typical fire incident involves several fire fighters 661, 662, 663 and 664 and many times fire fighters from different stations and departments. As the fire fighter 664 arrives on scene, his personal transceiver TPAS S 614 is in the "off" state, meaning the motion-sensing feature 444 of the personal transceiver TPASS 614 is not yet active. The display of the personal computer 622 at the command base monitor 620 indicates that fire fighter 664 is "off". It also displays that the TPASS 612 for fire fighter 662 is "on" meaning that fire fighter 662 is fighting the fire and not on the fire truck or at the station. Additionally, the display of the personal computer 622 at the command base monitor 620 indicates that the TPASS 613 for fire fighter 663 is "on" meaning that fire fighter 663 is fighting the fire and not on the fire truck or at the station. As for fire fighter 661, his TPASS 611 sends a signal to the personal computer 622 at the command base monitor 620 to indicate that TPASS 611 for fire fighter 661 is "on" meaning that fire fighter 661 is fighting the fire and not on the fire truck or at the station. Also, this fire fighter is down, so his TPASS 611 sounds an alarm and sends a signal that his TPASS alarm is "on." Thus, the command base monitor 620 can immediately send help for fire fighter 661.

As described previously, the TPASS is a motion sensing man-down alarm device containing a radio transceiver, such as transceiver 114, that is used by fire fighters and other personnel as a safety device to alert others their location, identification, and status, such as on the truck, at the scene or even that they are in danger. The TPASS is also used to send a fire fighter an evacuate signal to notify them of impending danger such as the imminent collapse of a building. As the fire fighters arrive on the scene, their TPASS devices transmit a periodic polling signal indicating they are present at the incident. As previously described, this polling signal may indicate a presence of the person and that the TPASS device is turned off, or not in the automatic motion sensing mode, for example fire fighter 664. The details of the computer screen indicate the presence of all the fire fighters 661, 662, 663 and 664 on scene. As the fire fighter 663 leaves the truck 665 an activation key 666 is removed from the TPASS device. This puts the TPASS in the "on" state. Putting the TPASS device in the "on" state causes it to transmit an RF signal that is received by the system transceiver 624 which passes this decoded signal to the PC 622 for further processing by the software where it is displayed on the PC screen. This action verifies that the fire fighters are present, their TPASS device is turned "on" and being monitored by the command base monitor 620. In addition to monitoring the status of fire fighters on scene, the system also contains the capability to indicate when a fire fighter has turned off their TPASS device and left the incident.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

The invention claimed is:

1. An automatic accountability system for locating and tracking personnel throughout an environment, said system comprising:

at least one locator transponder being positioned at various locations throughout the environment where the personnel pass by or through, said at least one locator transponder being assigned a RF power level and the at least one locator transponder having sensing means for detecting body heat of the passing personnel, a signal conditioning circuit for filtering and converting the detected body heat to an analog signal, an analog to digital converter for converting the analog signal of the body heat to a digital signal, a dipswitch being set to a unique code for identifying one of the various locations of the at least one locator transponder in the environment where the personnel pass by or through, a microcontroller for reading the digital signal and processing the digital signal with the unique code set by the dipswitch and reading the RF power level assigned to the locator transponder with pending battery conditions of the at least one locator transponder, the microprocessor encoding the digital signal, the RF power level, and the unique code into an encrypted data stream with error checking codes being added for insuring message integrity and security, a low power radio frequency transmitter being turned on by the microcontroller, and a power radio frequency transmitter modulating the digital signal according to the encrypted data stream and for transmitting the unique location code with the encrypted data stream and error checking codes for securely identifying a location of the at least one locator transponder;

at least one personal transceiver device being positioned on the passing personnel for receiving the location signal from the at least one locator-transponder as the personnel pass by the at least one locator-transponder, the at least one personal transceiver device transmitting a status signal having a received location code and an identification code, the identification code identifying the at least one personal transceiver device and status of the personal transceiver device; and a command base monitor for receiving the transmitted status signal and for recording, storing and displaying the location of the personnel having the at least one personal transceiver device as the personnel passes throughout the building in which the at least one locator-transponder device is positioned.

2. The automatic accountability system, as claimed in claim 1 wherein said sensing means utilizing at least one of the following for sensing the passing personnel:

a passive-infrared activated, low-power RF means, heat means, ultrasonic means, RF-field means, magnetic field means, capacitive-sense means, visible light disturbance means, or a pressure floor mat.

3. The automatic accountability system, as claimed in claim 2, wherein said sensing means utilizing at least one of the following for sensing the passing personnel:

a passive infrared detector, mechanical switch input, electronic switch input, ultrasonic sonar sensor, optical sensor, radio-frequency field sensor for detecting the presence of the personnel.

4. The automatic accountability system, as claimed in claim 2, wherein the locator transponder having a multiple-element pyroelectric sensor for determining a direction of travel as the personnel passes by the at least one locator transponder.

5. The automatic accountability system, as claimed in claim 1, wherein the at least one personal transceiver device having querying means for sending a querying signal to other personal transceiver devices being positioned on other personnel, said other personal transceiver devices receiving the query signal and automatically transmitting a location encoded signal containing location code and status back to the querying means of the at least one transceiver device that initiated the querying signal, and said at least one transceiver device determining the location of the other personnel wearing the at least one other personal transceiver device, wherein by querying each personal transceiver device, the at least one personal transceiver device obtaining a last location-transponder device code and determining from the location encoded signal received the distance between each personnel.

6. An automatic accountability system for use by emergency first responders, said system including a personal alert safety system being carried by each emergency first responder, each said personal alert safety system having condition responsive sensor means and alarm means indicative of personal safety conditions comprising: a small size portable semi-transparent casing, said semi-transparent casing being a watertight sealed cavity and having a sound resonating cavity with surrounding walls including at least one sound port providing a passage from said cavity; electric and electronic control and operating circuitry means disposed in said casing including a source of electric power, two series connected, single pole, push button control switches each having "on" and "off" positions and being spring biased to the "off" position, and flip-flop electronic switching means controlled by said control switches to enable said circuitry means to be turned "on" and "off" respectively by a sequence of simultaneous operations of said two control switches; a thin flat sound generating piezoelectric transducer device electrically connected to said circuitry means; a motion detector, and means rigidly mounting said motion detector within said chamber, said motion detector being responsive to motion of said casing; and said circuitry means further including a tone oscillator, a rate oscillator and an amplifier, connected between said motion detector and said sound generating piezoelectric transducer and responsive to the output of said motion detector and said sound generating piezoelectric transducer to cause a specific high intensity sweeping alarm signal to be emitted when the circuitry means is turned "on" and in the event that the casing is motionless, wherein said improvement comprising:

at least one personal transceiver device being positioned in said personal alert safety system and on each of the first emergency responders, the at least one personal transceiver device transmitting a status signal having a received location code and an identification code, the identification code identifying the at least one personal transceiver device and status of the personal transceiver device; and a command base monitor for receiving the transmitted status signal and for recording, storing and displaying the location of the first emergency responders having the at least one personal transceiver device.

7. The automated accountability system of claim 6, wherein the system identifying by name, location and ID number, each said at least one personal transceiver device and indicating a safety status of each said at least one personal transceiver device; and the system identifying a presence of a specific group of emergency first responders, such as fire fighters and police.

8. The automated accountability system of claim 6, wherein the system generating and displaying a Personal Accountability Report or PAR check and providing a roll-call feature, wherein the PAR check is initiated from the command base monitor.

9. The automated accountability system of claim 8, wherein the system being configured to automatically perform the PAR check on a periodic basis or on demand wherein said command base unit initiating the PAR request by transmitting a specially encoded RF signal to the personal alert safety system having the personal transceiver device, wherein once, the PAR request being received by the personal alert safety system having the personal transceiver device, the device immediately responding by automatically transmitting back a PAR request acknowledgement to the command base monitor to provide information that indicates that the personal alert safety system having the personal transceiver device has received the PAR request, the personal alert safety system having the personal transceiver device gathering status data and transmitting the PAR information in an RF signal containing identity and status data of the personal alert safety system having the personal transceiver device to the command base monitor for displaying wherein the displayed date includes motion or movement of the personal alert safety system having the personal transceiver device carried by a particular emergency responder, temperature of the environment surrounding the personal alert safety system having the personal transceiver device, location of the personal alert safety system having the personal transceiver device, air pressure of a breathing apparatus air tank, an elapsed time of operation of the breathing apparatus air tank, the amount of air remaining in the breathing apparatus air tank, motion alarm activated, panic alarm activated and recall or evacuate signal activated or acknowledged.

10. The automated accountability system of claim 8, wherein the personal alert safety system having the personal transceiver device being attached to the emergency responder provides location and status of other emergency responders by way of each of the personal alert safety system having the personal transceiver device as requested through the personal alert safety system having the personal transceiver device.

11. An automatic accountability system for locating and tracking personnel throughout an environment, in combination with an automatic accountability system for use by, said emergency first responder system including a personal alert safety system being carried by each emergency first responder, each said personal alert safety system having condition responsive sensor means and alarm means indicative of personal safety conditions comprising: a small size portable semi-transparent casing, said semi-transparent casing being a watertight sealed cavity and having a sound resonating cavity with surrounding walls including at least one sound port providing a passage from said cavity; electric and electronic control and operating circuitry means disposed in said casing including a source of electric power, two series connected, single pole, push button control switches each having “on” and “off” positions and being spring biased to the “off” position, and flip-flop electronic switching means controlled by said control switches to enable said circuitry means to be turned “on” and “off” respectively by a sequence of simultaneous operations of said two control switches; a thin flat sound generating piezoelectric transducer device electrically connected to said circuitry means; a motion detector, and means rigidly mounting said motion detector within said chamber, said motion detector being responsive to motion of said casing; and said circuitry means further including a tone oscillator, a rate oscillator and an amplifier, connected between said motion detector and said sound generating piezoelectric transducer device and responsive to the output of said motion detector and said sound generating piezoelectric transducer device to cause a specific high intensity sweeping alarm signal to be emitted when the circuitry means is turned “on” and in the event that the casing is motionless, wherein said systems comprising in combination:

at least one locator transponder being positioned at various locations throughout the environment where the personnel pass by or through, said at least one locator transponder having sensing means for detecting the passing personnel and transmitting means for transmitting a location signal having a location code for identifying a location of the at least one locator transponder;

at least one personal transceiver device being positioned on the passing personnel for receiving the location signal from the the at least one locator transponder as the personnel pass by the at least one the at least one locator transponder, the at least one personal transceiver device transmitting a status signal having a received location code and an identification code, the identification code identifying the at least one personal transceiver device and status of the personal transceiver device; and an environment command base monitor for receiving the transmitted status signal and for recording, storing and displaying the location of the personnel having the at least one personal transceiver device as the personnel passes throughout the environment in which the at least one locator transponder is positioned;

at least one personal transceiver device being positioned in said personal alert safety system and on each of the emergency responders, the at least one personal transceiver device transmitting a status signal having the received location code and an identification code, the identification code identifying the at least one personal transceiver device and status of the personal transceiver device; and an emergency responder command base monitor for receiving the transmitted status signal and for recording, storing and displaying the location of the emergency first responders having the at least one personal transceiver device and the personnel having the personal transciever as the emergency first responders and the personnel pass throughout the environment in which the at least one locator transponder is positioned at various locations in the environment.

12. The automatic accountability system, as claimed in claim 11, wherein said sensing means utilizing at least one of the following for sensing the passing personnel:

a passive-infrared activated, low-power RF means, heat means, ultrasonic means, RF-field means, magnetic field means, capacitive-sense means, visible light disturbance means, a pressure floor mat, or other mechanical means.

13. The automatic accountability system, as claimed in claim 12, wherein said sensing means utilizing at least one of the following for sensing the passing personnel:

a passive infrared detector, mechanical switch input, electronic switch input, ultrasonic sonar sensor, optical sensor, radio-frequency field sensor for detecting the presence of the personnel.

14. The automatic accountability system, as claimed in claim 12, wherein the locator transponder has a multiple-element pyroelectric sensor for determining a direction of travel as the personnel passes by the at least one locator transponder.

15. The automatic accountability system, as claimed in claim 12, wherein said sensing means comprising an adjustable and selectable means for controlling the radiated RF transmitter power output to limit propagation of detectable radiated RF signals from a range of several inches to several hundred feet, and having a settable unique identity code contained within the radiated RF signals to identify the at least one locator transponder and the radiated RF transmitter power output.

16. The automatic accountability system, as claimed in claim 11, wherein the at least one personal transceiver device having querying means for sending a querying signal to other personal transceiver devices being positioned on other personnel, said other personal transceiver devices receiving the querying signal and automatically transmit a signal containing location code and status back to the querying means of the at least one transceiver device that initiated the querying signal, and said at least one transceiver device determining the location of the other personnel wearing the at least one other personal transceiver device, wherein by querying each personal transceiver device, the at least one personal transceiver device obtaining a last location-transponder device code and determining from the location code signal received the distance between each personnel.

17. The automated accountability system of claim 11, wherein the system identifying by name, location and ID number, each said at least one personal transceiver device and indicating a safety status of each said at least one personal transceiver device; and the system identifying a presence of a specific group of emergency first responders, such as fire fighters and police.

18. The automated accountability system of claim 11, wherein the system generating and displaying a Personal Accountability Report or PAR check and providing a roll-call feature, wherein the PAR check is initiated from the command base monitor.

19. The automated accountability system of claim 13, wherein the system being configured to automatically perform the PAR check on a periodic basis or on demand wherein said command base unit initiating the PAR request by transmitting a specially encoded RF signal to the personal alert safety system having the personal transceiver device, wherein once, the PAR request being received by the personal alert safety system having the personal transceiver device, the device immediately responding by automatically transmitting back a PAR request acknowledgement to the command base monitor to provide information that indicates that the personal alert safety system having the personal transceiver device has received the PAR request, the personal alert safety system having the personal transceiver device gathering status data and transmitting the PAR information in an RF signal containing identity and status data of the personal alert safety system having the personal transceiver device to the command base monitor for displaying wherein the displayed date includes motion or movement of the personal alert safety system having the personal transceiver device carried by a particular emergency responder, temperature of the environment surrounding the personal alert safety system having the personal transceiver device, location of the personal alert safety system having the personal transceiver device, air pressure of a breathing apparatus air tank, an elapsed time of operation of the breathing apparatus air tank, the amount of air remaining in the breathing apparatus air tank, motion alarm activated, panic alarm activated and recall or evacuate signal activated or acknowledged.

* * * * *